2,748,114
Patented May 29, 1956

2,748,114

MEROCYANINE DYES CONTAINING A SULFONE GROUP

Leslie G. S. Brooker and Donald W. Heseltine, Rochester, N. Y., assignors to Eastman Kodak Company, Rochester, N. Y., a corporation of New Jersey No Drawing. Application July 12, 1954,
Serial No. 442,930

14 Claims. (Cl. 260—240.4)

This invention relates to merocyanine dyes and methods for making them. More particularly this invention relates to merocyanine dyes containing a sulfone group, methods for making such dyes, and photographic emulsions containing these new dyes.

Accordingly, it is an object of our invention to provide new merocyanine dyes containing a sulfone group. Another object is to provide methods for making these merocyanine dyes. Still another object is to provide photographic emulsions sensitized with these new merocyanine dyes. Another object is to provide new intermediates useful in preparing these merocyanine dyes and a method for making these new intermediates. Other objects will become apparent from a consideration of the following description and examples.

The dyes of our invention can advantageously be represented by the following general formula:

I. 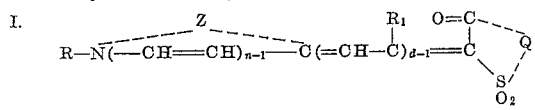

wherein R represents an alkyl group, such as methyl, ethyl, n-propyl, isopropyl, n-butyl, isobutyl, n-amyl, carboxymethyl, β-carboxyethyl, carbomethoxymethyl, carbethoxymethyl, β-hydroxyethyl, β-methoxyethyl, allyl (vinylmethyl), benzyl (phenylmethyl), etc. (an alkyl group of the formula $C_mH_{2m+1}$ wherein $m$ represents a positive integer of from 1 to 4, for example), $R_1$ represents a hydrogen atom or an alkyl group (e. g. methyl, ethyl, propyl, etc.), $d$ represents a positive integer of from 1 to 3, (when $d$ is 3, $R_1$ is always a hydrogen atom), $n$ represents a positive integer of from 1 to 2, Q represents the non-metallic atoms necessary to complete a heterocyclic nucleus containing five atoms in the heterocyclic ring (especially where three of said atoms are carbon atoms, one of said atoms is a sulfur atom, and the last atom is a carbon atom or nitrogen atom), and Z represents the non-metallic atoms necessary to complete a heterocyclic nucleus containing from 5 to 6 atoms in the heterocyclic ring, such as those selected from the group consisting of those of the thiazole series (e. g. thiazole, 4-methylthiazole, 5-methylthiazole, 4-phenylthiazole, 5-phenylthiazole, 4,5-dimethylthiazole, 4,5-diphenylthiazole, 4-(2-thienyl) thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole (i. e. [2,1]-naphthothiazole), β-naphthothiazole (i. e. [1,2]-naphthothiazole), 5-methoxy-β-naphthothiazole, 5-ethoxy-β-naphthothiazole, 7-methoxy-α-naphthothiazole, 8-methoxy-α-naphthothiazole, etc.), those of the thianaphtheno-7′,6′,4,5-thiazole series (e. g. 4′-methoxythianaphtheno-7′,6′,4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5 - phenylbenzoxazole, 5 - methylbenzoxazole, 6-methylbenzoxazole, 5,6 - dimethylbenzoxazole, 4,6 - dimethylbenzoxazole, 5-methoxybenzoxazole, 6-methoxybenzoxazole, 5-ethoxybenzoxazole, 6-chlorobenzoxazole, 5 - hydroxybenzoxazole, 6 - hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3 - phenylpyridine, 4 - phenylpyridine, 6 - phenylpyridine, etc.), those of the 4-pyridine series (e. g. 2-methylpyridine, 3-methylpyridine, 2-chloropyridine, 3-chloropyridine, 2,3-dimethylpyridine, 2,5 - dimethylpyridine, 2,6 - dimethylpyridine, 2-hydroxypyridine, 3-hydroxypyridine, etc.), etc.

According to our invention, we provide the new dyes represented by Formula I above wherein $d$ represents 1 by reacting together a cyclammonium quaternary salt selected from those represented by the following general formula:

II. 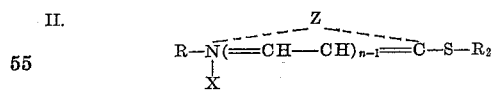

wherein R, $n$, and Z each have the values given above, $R_2$ represents an alkyl group (e. g. methyl, ethyl, etc.) or an aryl group (e. g. phenyl, o-, m-, and p-tolyl, etc.), and X represents an acid anion, e. g. chloride, bromide, iodide, thiocyanate, sulfamate, methylsulfate, ethylsulfate, perchlorate, benzenesulfonate, p-toluenesulfonate, etc., with a compound selected from those represented by the following general formula:

III. 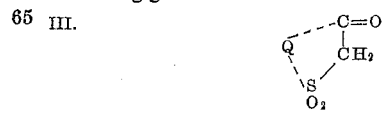

wherein Q has the values given above.

The new dyes of our invention represented by Formula I above wherein $d$ represents 2 or 3 ($R_1$ represents a hydrogen atom) can be prepared by condensing a cyclammonium quaternary salt selected from those represented by the following general formula:

IV.
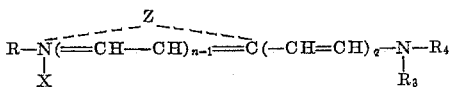

wherein R, n, X, and Z each have the values given above, q represents a positive integer of from 1 to 2, $R_3$ represents an acyl group (e. g. acetyl, propionyl, benzoyl, etc.), and $R_4$ represents an aryl group (e. g. phenyl, o-, m-, and p-tolyl), together with a compound selected from those represented by Formula III.

The new dyes of our invention represented by Formula I above wherein d represents 2 and $R_1$ represents an alkyl group can advantageously be prepared by condensing together as compound selected from those represented by the following general formula:

V.
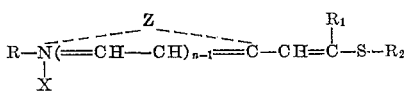

wherein R, $R_2$, X, n, and Z each have the values given above and $R_1$ is an alkyl group as defined above, with a compound selected from those represented by Formula III above. The intermediates of Formulas II and IV are well known in the art, while the intermediates of Formula V can be prepared according to the general method described in U. S. Patent 2,315,498, issued April 6, 1943.

The condensations of the compounds of Formula III with those of Formulas II, IV, or V can advantageously be accelerated by heating the reaction mixture, generally temperatures varying from ambient temperature (ca. 20° C.) to the reflux temperature of the reaction mixture being satisfactory. The condensations can be carried out in the presence of an inert solvent, such as pyridine, nitrobenzene, ethanol, n-propanol, isopropanol, n-butanol, etc.

The condensations of the compounds of Formula III with those of Formulas II, IV, or V can advantageously be carried out in the presence of a basic condensing agent, such as the trialkylamines (e. g. triethylamine, tri-n-propylamine, triisopropylamine, tri-n-butylamine, triisobutylamine, tri-n-amylamine, etc.), N-alkylpiperidines (e. g. N-methylpiperidine, N-ethylpiperidine, etc.), N,N-dialkylanilines (e. g. N,N-dimethylaniline, diethylaniline, etc.), etc.

The intermediates of Formula III above can also be condensed with a p-dialkylaminobenzaldehyde (e. g. p-dimethylaminobenzaldehyde, p-diethylaminobenzaldehyde, etc.) in the presence of a basic condensing agent, e. g. piperidine, to give hemioxonol dyes.

The following examples will serve to illustrate the manner whereby the new dyes of our invention can be prepared.

EXAMPLE 1

*5 - [(3 - ethyl - 2(3H) - benzoxazolylidene)ethylidene]-3-methyl-2-phenyl-4-thiazolidone-1,1-dioxide*

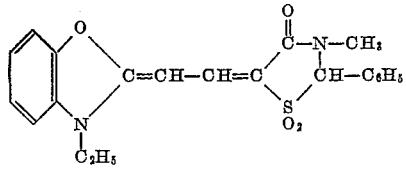

3-methyl-2-phenyl-4-thiazolidone-1,1-dioxide (1 mol., 2.25 g.), 2-β-acetanilidovinyl-3-ethylbenzoxazolium iodide (1 mol., 4.34 g.) and triethylamine (1 mol.+40%, 2.0 ml.) were dissolved in ethyl alcohol (25 ml.) and heated under reflux for thirty minutes. The reaction mixture was then chilled overnight and the crude dye filtered off, washed with methyl alcohol and dried. After two recrystallizations from pyridine and methyl alcohol, the yield of pure dye was 2.60 g. (65%). M. P. 238–239° C. dec.

EXAMPLE 2

*5 - [(3 - ethyl - 2(3H) - benzothiazolylidene)ethylidene]-3-methyl-2-phenyl-4-thiazolidone-1,1-dioxide*

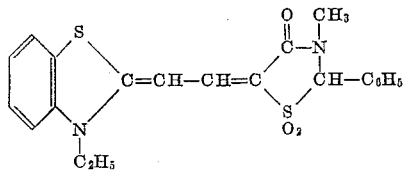

3-methyl-2-phenyl-4-thiazolidone-1,1-dioxide (1 mol., 2.25 g.), 2-β-acetanilidovinyl-3-ethylbenzothiazolium iodide (1 mol., 4.50 g.) and triethylamine (1 mol.+40%, 2.0 ml.) were dissolved in ethyl alcohol (35 ml.) and heated under reflux for thirty minutes. The reaction mixture was chilled overnight and the crude dye filtered off and thoroughly washed with methyl alcohol. The crude dye was then twice boiled with 200 ml. portions of methyl alcohol, filtered hot and dried. The yield of purified dye after two recrystallizations from pyridine and methyl alcohol was 3.18 g. (77%). M. P. 245–246° C. dec.

EXAMPLE 3

*5 - [(1 - ethyl-2(1H) - quinolylidene)ethylidene] - 3-methyl-2-phenyl-4-thiazolidone-1,1-dioxide*

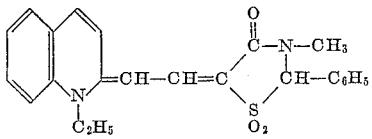

3-methyl-2-phenyl-4-thiazolidone-1,1-dioxide (1 mol., 2.25 g.), 2-β-acetanilidovinyl-1-ethylquinolinium iodide (1 mol., 4.44 g.) and triethylamine (1 mol.+40%, 2.0 ml.) were dissolved in ethyl alcohol (35 ml.) and heated under reflux for thirty minutes. The reaction mixture was chilled overnight, filtered and the crude dye washed with methyl alcohol. The crude product was boiled with two 200 ml. portions of methyl alcohol, filtered hot and dried. After two recrystallizations from pyridine and methyl alcohol, the yield of pure dye was 3.30 g. (82%); M. P. 273–274° C. dec.

EXAMPLE 4

*5 - [(1 - ethyl - 2(1H) - naphtho[1,2]thiazolylidene)ethylidene] - 3 - methyl - 2 - phenyl - 4 - thiazolidone-1,1-dioxide*

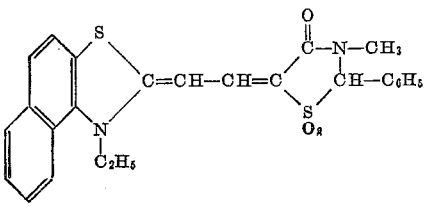

3-methyl-2-phenyl-4-thiazolidone-1,1-dioxide (1 mol., 1.12 g.) and 2-β-acetanilidovinyl-1-ethylnaphtho[1,2] thiazolium-p-toluenesulfonate (1. mol., 2.72 g.) were dissolved in ethyl alcohol (20 ml.) and triethylamine (2 mols., 1.4 ml.) was added. The reaction mixture was heated under reflux for thirty minutes and was then chilled overnight, filtered, and the crude dye washed with methyl alcohol and dried. After two recrystallizations from pyridine the yield of purified dye was 1.35 g. (58%) and it had M. P. 285–286° C. dec.

EXAMPLE 5

*3 - methyl - 2 - phenyl - 5 - [(1,3,3 - trimethyl - 2(3H)-indolylidene)ethylidene] - 4 - thiazolidone - 1,1 - dioxide*

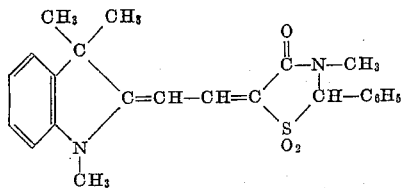

3-methyl-2-phenyl-4-thiazolidone-1,1-dioxide (1 mol., 1.12 g.), 2-β-acetanilidovinyl-1,3,3-trimethylpseudoindolium iodide (1 mol., 2.23 g.) and triethylamine (2 mols., 1.4 ml.) were refluxed in ethyl alcohol (20 ml.) for one hour. The reaction mixture was then diluted with water (50 ml.) and chilled overnight. The crude dye was then filtered off, washed well with methyl alcohol and dried. The yield of purified dye was 0.55 g. (28%) after two crystallizations from pyridine and methyl alcohol. The purified dye had M. P. 256–257° C. ldec.

EXAMPLE 6

*5 - [(5 - chloro - 3 - ethyl - 2(3H) - benzothiazolylidene)ethylidene] - 3 - methyl - 2 - phenyl - 4 - thiazolidone-1,1-dioxide*

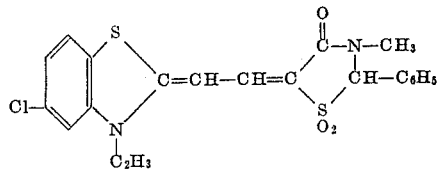

3-methyl-2-phenyl-4-thiazolidone-1,1-dioxide (1 mol., 1.12 g.), 2-β-acetanilidovinyl-5-chloro-3-ethylbenzothiazolium iodide (1 mol., 2.42 g.) and triethylamine (2 mol., 1.4 ml.) were heated under reflux for thirty minutes in ethyl alcohol (20 ml.). The reaction mixture was then chilled overnight, the product filtered off, thoroughly washed with methyl alcohol and dried. The yield of purified dye after two recrystallizations from pyridine and methyl alcohol was 0.78 g. (35%). The pure dye had M. P. 293–294° C. dec.

EXAMPLE 7

*5 - (2 - p - dimethylaminobenzylidene) - 3 - methyl - 2-phenyl - 4 - thiazolidone - 1,1 - dioxide*

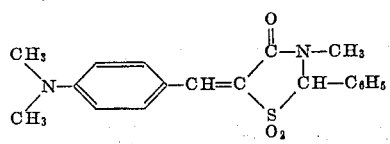

3 - methyl - 2 - phenyl - 4 - thiazolidone - 1,1 - dioxide (1 mol., 2.25 g.) and p-dimethylaminobenzaldehyde (2 mols., 2.98 g.) were dissolved in ethyl alcohol (35 ml.) and two drops of piperidine were added. The reaction mixture was then heated under reflux for two hours, chilled overnight and the crude dye filtered off, washed with methyl alcohol and dried. After two recrystallizations from pyridine and methyl alcohol, the yield of purified dye was 2.05 g. (57%), M. P. 213–15° C. dec.

EXAMPLE 8

*3 - benzyl - 5 - [(3 - ethyl - 2(3H) - benzoxazolylidene)-ethylidene] - 2 - phenyl - 4 - thiazolidone - 1,1 - dioxide*

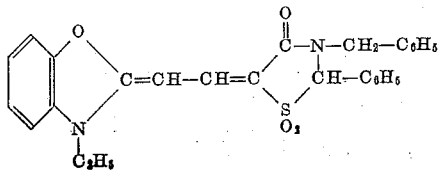

3 - benzyl - 2 - phenyl - 4 - thiazolidone - 1,1 - dioxide (1 mol., 1.51 g.), 2 - β - acetanilidovinyl - 3 - ethylbenzoxazolium iodide (1 mol., 2.17 g.) and triethylamine (2 mols., 1.4 ml.) were dissolved in ethyl alcohol and heated under reflux for thirty minutes. The reaction mixture was chilled and the crude dye thrown out of solution by the addition, with stirring, of water (100 ml.). The water was decanted and the sticky residue taken up in boiling methyl alcohol (30 ml.) and chilled overnight. The crude crystalline product was filtered off, dried and twice recrystallized from methyl alcohol. The yield of purified dye was 0.33 g. (14%); M. P. 234–236° C. dec.

EXAMPLE 9

*3 - benzyl - 5 - [(3 - ethyl - 2(3H) - benzothiazolylidene)ethylidene] - 2 - phenyl - 4 - thiazolidone - 1,1-dioxide*

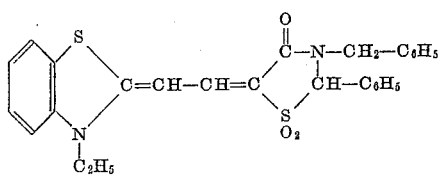

3 - benzyl - 2 - phenyl - 4 - thiazolidone - 1,1 - dioxide (1 mol., 1.51 g.), 2 - β - acetanilidovinyl - 3 - ethylbenzothiazolium iodide (1 mol. 2.25 g.) and triethylamine (2 mol., 1.4 ml.) were dissolved in ethyl alcohol (20 ml.) and heated under reflux for thirty minutes. The reaction mixture was then chilled and the crude dye thrown out of solution by the addition of water (100 ml.). The water was decanted and the crude dye dissolved in methyl alcohol (50 ml.), water (200 ml.) was added and the dye extracted with five 200 ml. portions of ether. The ether was removed by distillation and the residue dissolved in boiling methyl alcohol (50 ml.) and chilled overnight and the crude dye filtered off and dried. After two recrystallizations from methyl alcohol, the yield of pure dye was 0.80 g. (33%), M. P. 188–190° C. dec.

EXAMPLE 10

*3 - benzyl - 5 - [(1 - ethyl - 2(1H) - naphtho[1,2]thiazolylidene)ethylidene] - 2 - phenyl - 4 - thiazolidone-1,1 - dioxide*

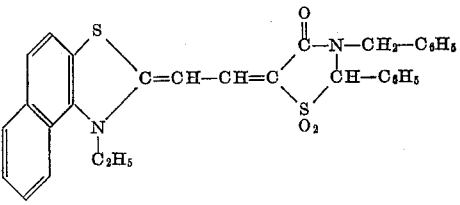

3 - benzyl - 2 - phenyl - 4 - thiazolidone - 1,1 - dioxide (1 mol., 1.51 g.), 2 - β - acetanilidovinyl - 1 - ethylnaphtho[1,2]thiazolium iodide (1 mol., 2.50 g.) and triethylamine (2 mols., 1.4 ml.) were dissolved in ethyl alcohol (30 ml.) and heated under reflux for thirty minutes. The cooled reaction mixture was stirred with water (150 ml.) and the dye extracted with eight 200 ml. portions of ether. The ether was removed by distillation and the residue boiled with methyl alcohol (150 ml.) and chilled overnight. The crude dye was then filtered off, washed with methyl alcohol and dried. After two recrystallizations from pyridine and methyl alcohol, the yield of purified dye was 0.80 g. (30%), M. P. 218–220° C. dec.

EXAMPLE 11

*3 - benzyl - 5 - p - dimethylaminobenzylidene - 2 - phenyl-4 - thiazolidone - 1,1 - dioxide*

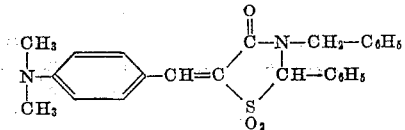

3 - benzyl - 2 - phenyl - 4 - thiazolidone - 1,1 - dioxide (1 mol., 1.51 g.), 2 - p - dimethylaminobenzaldehyde (2 mols., 1.44 g.) and two drops of piperidine were dissolved in ethyl alcohol (20 ml.) and heated under reflux for one hour. The reaction mixture was chilled overnight, filtered, and the crude dye washed with methyl alcohol and dried. After two recrystallizations from pyridine and methyl alcohol, the yield of purified dye was 1.61 g. (75%), M. P. 213-214° C. dec.

EXAMPLE 12

*5-[(3-ethyl-2(3H)-benzothiazolylidene)ethylidene]-2-methyl-4(5H)-thiazolone-1,1-dioxide*

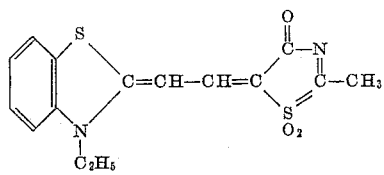

2-methyl-4(5H)-thiazolone-1,1-dioxide (2 mols., 2.74 g.), 2-β-acetanilidovinyl-3-ethylbenzothiazolium iodide (1 mol., 4.50 g.) and triethylamine (1 mol., 1.4 ml.) were dissolved in ethyl alcohol (15 ml.) and heated under reflux for thirty minutes. The reaction mixture was chilled overnight, filtered, and the crude dye dried. A chloroform solution of the dye was filtered through a ½ inch pad of Norit (decolorizing carbon) to remove symmetrical diethylthiacarbocyanine and the chloroform removed by distillation. After three recrystallizations from methyl alcohol, the yield of purified dye was 2.21 g. (67%), M. P. 139-140° C.

*Anal.*—Calcd. for $C_{15}H_{14}N_2S_2O_3 \cdot CH_3OH$: C, 52.6; H, 5.0. Found: C, 53.2; H, 5.4.

EXAMPLE 13

*5-[(1-ethyl-2(1H)-naphtho[1,2]thiazolylidene)ethylidene]-2-methyl-4(5H)-thiazolone-1,1-dioxide*

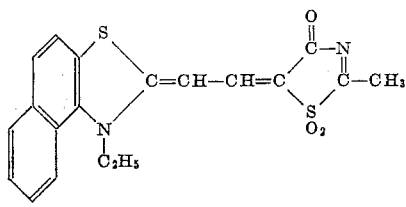

2-methyl-4(5H)-thiazolone-1,1-dioxide (1 mol., 1.37 g.), 2-β-acetanilidovinyl-1-ethylnaphtho[1,2] thiazolium iodide (1 mol., 5.0 g.) and triethylamine (1 mol., 1.4 g.) were dissolved in ethyl alcohol (20 ml.) and heated under reflux for thirty minutes. The reaction mixture was chilled and filtered and the crude dye was dissolved in chloroform and filtered through a ½ inch pad of Norit (decolorizing carbon) and the Norit washed with an additional 100 ml. of chloroform. The combined chloroform solutions were evaporated to dryness, the residue stirred with methyl alcohol (75 ml.), chilled, and the crude dye filtered off. After two recrystallizations from methyl alcohol, the yield of purified dye was 1.45 g. (38%), M. P. 164-165° C. dec.

*Anal.*—Calcd. for $C_{19}H_{16}N_2S_2O_3 \cdot CH_3OH$: C, 57.8; H, 4.8. Found: C, 57.8; H. 5.0.

EXAMPLE 14

*5-[(1-ethyl-2(1H)-quinolylidene)ethylidene]-2-methyl-4(5H)-thiazolone-1,1-dioxide*

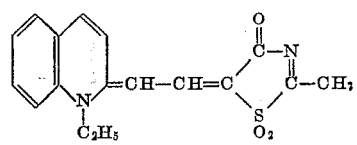

2-methyl-4(5H)-thiazolone-1,1-dioxide (1 mol., 1.37 g.), 2-β-acetanilidovinyl-1-ethylquinolinium iodide (1 mol., 4.44 g.) and triethylamine (1 mol., 1.4 ml.) were dissolved in ethyl alcohol (20 ml.) and heated under reflux for thirty minutes. The reaction mixture was chilled, diluted with water (100 ml.) and the crude dye extracted with four 50 ml. portions of chloroform. The combined chloroform solutions were then filtered through a ½ inch pad of Norit (decolorizing carbon), evaporated to dryness and the crude dye dissolved in hot methyl alcohol (50 ml.), filtered, and chilled overnight. The crude dye was then filtered off and dried. After two recrystallizations from methyl alcohol, the yield of purified dye was 1.30 g. (40%), M. P. 109-110° C.

EXAMPLE 15

*5-[(1-ethyl-2(1H)-quinolylidene)ethylidene]-2-methyl-4(5H)-thiazolone-1,1-dioxide*

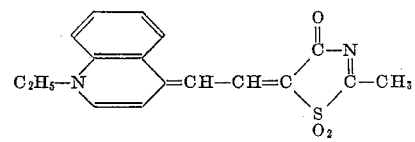

2-methyl-4(5H)-thiazolone-1,1-dioxide (1 mol., 1.37 g.), 4-β-acetanilidovinyl-1-ethylquinolinium iodide (1 mol., 4.44 g.) and triethylamine were dissolved in ethyl alcohol (20 ml.) and heated under reflux for thirty minutes. The reaction mixture was cooled, diluted with water (100 ml.) and the dye extracted with four 50 ml. portions of chloroform. The combined chloroform solutions were filtered through a ½ inch pad of Norit (decolorizing carbon) and the Norit washed with an additional 50 ml. of chloroform. The chloroform was then distilled off and the residue dissolved in hot methyl alcohol (40 ml.), filtered, and chilled. The crude product was then filtered off and dried. After two recrystallizations from methyl alcohol the yield of purified dye was 0.81 g. (25%), M. P. 125-127° C.

EXAMPLE 16

*2-[(3-ethyl-2(3H)-benzoxazolylidene)ethylidene]-3(2H)-thianaphthenone-1,1-dioxide*

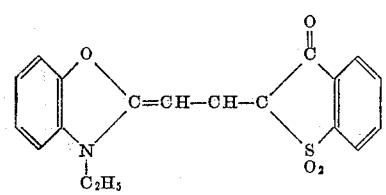

3(2H)-thianaphthenone-1,1-dioxide (1 mol., 0.91 g.), 2-β-acetanilidovinyl-3-ethylbenzoxazolium iodide (1 mol., 2.17 g.) and triethylamine (2 mols., 1.4 ml.) were dissolved in ethyl alcohol (25 ml.) and heated under reflux for thirty minutes. The reaction mixture was then chilled and filtered and the crude dye thoroughly washed with methyl alcohol and dried. After two recrystallizations from pyridine and methyl alcohol, the yield was 1.48 g. (84%), M. P. 267-268° C. dec.

EXAMPLE 17

*2-[(3-ethyl-2(3H)-benzothiazolylidene)ethylidene]-3(2H)thianaphthenone-1,1-dioxide*

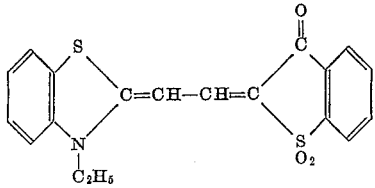

3(2H)-thianaphthenone-1,1-dioxide (1 mol., 0.91 g.), 2-β-acetanilidovinyl-3-ethylbenzothiazolium iodide (1 mol., 2.25 g.) and triethylamine (2 mols., 1.4 ml.) were dissolved in ethyl alcohol (20 ml.) and heated under reflux for thirty minutes. The reaction mixture was then chilled, filtered, and the crude dye thoroughly washed with methyl alcohol and dried. After two recrystallizations from pyridine and methyl alcohol, the yield of purified dye was 1.51 g. (83%), M. P. 263–264° C. dec.

EXAMPLE 18

*2-[(1-ethyl-2(1H)-quinolylidene)ethylidene]-3(2H)-thianaphthenone-1,1-dioxide*

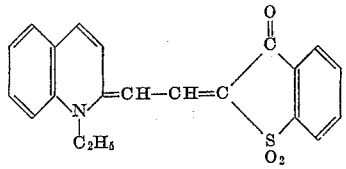

3(2H)-thianaphthenone-1,1-dioxide (1 mol., 0.91 g.), 2-β-acetanilidovinyl-1-ethylquinolinium iodide (1 mol., 2.22 g.) and triethylamine (2 mols., 1.4 ml.) were dissolved in ethyl alcohol (20 ml.) and heated under reflux for thirty minutes. The reaction mixture was then filtered hot and the crude dye washed with methyl alcohol and dried. After two recrystallizations from pyridine and methyl alcohol, the yield of purified dye was 1.60 g. (89%), M. P. 286–287° C. dec.

EXAMPLE 19

*2-[(3-ethyl-2(3H)-benzothiazolylidene)isopropylidene]-3(2H)-thianaphthenone-1,1-dioxide*

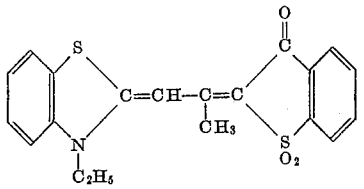

3(2H)-thianaphthenone-1,1-dioxide (1 mol., 1.82 g.), 2-(2-methylmercaptopropenyl)benzothiazole ethyl ethosulfate (1 mol., 3.89 g.) and triethylamine (1 mol., 1.4 ml.) were dissolved in ethyl alcohol (25 ml.) and heated under reflux for one hour. The reaction mixture was then filtered hot and the crude dye washed with methyl alcohol and dried. After two recrystallizations from pyridine and methyl alcohol, the yield of purified dye was 1.70 g. (44%), M. P. 288–289° C. dec.

EXAMPLE 20

*2-[(1-ethyl-2(1H)-naphthol[1,2]thiazolylidene)isopropylidene]-3(2H)-thianaphthenone-1,1dioxide*

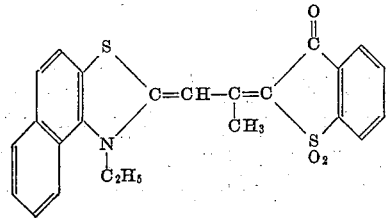

3(2H)-thianaphthenone-1,1-dioxide (1 mol., 1.82 g.), 1-ethyl-2-(2-methylmercaptopropenyl) naphtho[1,2]thiazolium ethosulfate (1 mol., 4.34 g.) and triethylamine (1 mol., 1.4 ml.) were dissolved in ethyl alcohol (25 ml.) and heated under reflux for one hour. The reaction mixture was then filtered hot and the crude dye was thoroughly washed with methyl alcohol and dried. After two recrystallizations from pyridine and methyl alcohol, the yield of purified dye was 1.60 g. (33%), M. P. 281–2° C.

EXAMPLE 21

*2-[1-ethyl-2(1H)-naphtho[1,2]thiazolylidene]-3(2H)-thianaphthenone-1,1-dioxide*

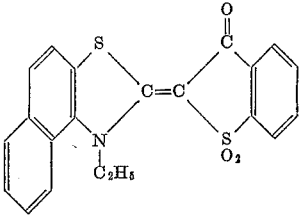

3(2H)-thianaphthenone-1,1-dioxide (0.91 g., 1 mol.) and 1-ethyl-2-methylmercaptonaphtho[1,2]thiazolium p-toluenesulfonate (3.23 g., 1 mol. plus 50 percent excess) were dissolved in ethyl alcohol (20 ml.) and triethylamine (1.4 ml., 1 mol. plus 100 percent excess) was added. The reaction mixture was then heated under reflux for thirty minutes and chilled overnight. The crude dye was filtered off, washed with methyl alcohol, and dried. After two recrystallizations from pyridine and methyl alcohol, the yield of purified dye was 1.18 g. (61 percent). M. P. 303–4° C. dec.

EXAMPLE 22

*2-(1-ethyl-2(1H)-quinolylidene)-3(2H)-thianaphthenone-1,1-dioxide*

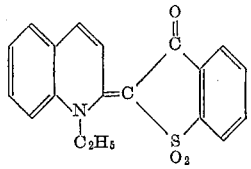

1 - ethyl - 2 -phenylmercaptoquinolinium - p - toluenesulfonate (2.19 g., 1 mol.) and 3(2H)-thianaphthenone-1,1-dioxide (0.91 g., 1 mol.) were dissolved in ethyl alcohol (20 ml.) and triethylamine (1.4 ml., 1 mol. plus 100 percent excess) was added. The reaction mixture was heated under reflux for thirty minutes and the crude dye was thrown out of solution by the addition of water (100 ml.). The crude dye was then stirred with methyl alcohol until crystalline, chilled overnight, filtered, and dried. After two crystallizations from methyl alcohol, the yield of pure dye was 1.26 g. (75 percent). M. P. 206–7° C.

EXAMPLE 23

*5-[4-(3-ethyl-2(3H)-benzothiazolylidene)-2-butenylidene]-3-methyl-2-phenyl-4-thiazolidone-1,1-dioxide*

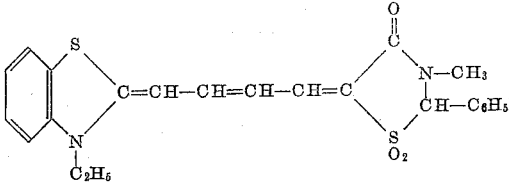

2 - anilinobutadienyl - 3 - ethylbenzothiazolium iodide (2.17 g., 1 mol.), 3-methyl-2-phenylthiazolidone-1,1-dioxide (2.25 g., 1 mol. plus 100 percent excess), acetic anhydride (1.01 g., 1 mol. plus 100 percent excess), and triethylamine (1.4 ml., 1 mol. plus 100 percent excess) were heated under reflux for thirty minutes in pyridine (20 ml.) The reaction mixture was chilled and filtered, the solid discarded, and the filtrate treated with methyl alcohol, 100 ml., chilled overnight, and the crude product filtered off. After two recrystallizations from pyridine and methyl alcohol, the yield of pure dye was 0.98 g. (45 percent). M. P. 250–251° C. dec.

EXAMPLE 24

*5 - [4 - (1 - ethyl - 2(1H) - naphtho[1,2]thiazolylidene)- 2 - butenylidene] - 3 - methyl - 2 - phenyl - 4 - thiazol- idone-1,1-dioxide*

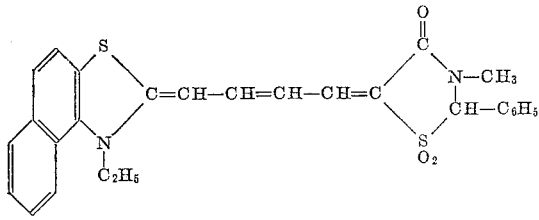

2 - anilinobutadienyl - 1 - ethylnaphtho[1,2]thiazolium iodide (2.42 g., 1 mol.), 3-methyl-2-phenyl-4-thiazol- idone-1,1-dioxide (2.25 g., 1 mol. plus 100 percent excess), acetic anhydride (1.01 g., 1 mol. plus 100 percent excess), and triethylamine (1.4 ml., 1 mol. plus 100 percent excess) were heated under reflux for thirty minutes in pyridine (20 ml.). The reaction mixture was filtered hot and the solid discarded. The filtrate was treated with methyl alcohol (100 ml.) and chilled overnight. The crude dye was filtered off, washed with methyl alcohol, and dried. After two recrystallizations from pyridine and methyl alcohol, the yield of purified dye was 0.61 g. (25 percent). M. P. 281–2° C. dec.

In Examples 23 and 24 above, the intermediate represented by Formula IV was formed in situ by employing an intermediate similar to that of Formula IV, except that $R_3$ represents a hydrogen atom, together with a carboxylic anhydride.

We have also found that un-ionized dyes similar to those described in the copending applications Serial Nos. 282,696, filed April 16, 1952 (now abandoned) and 375,279, filed August 19, 1953, of Leslie G. S. Brooker and Frank L. White, now U. S. Patent 2,739,964, issued March 27, 1956, can be prepared by reacting together a dye selected from those represented by Formula I above wherein $R_1$ represents a methyl group together with a cyclammonium quaternary salt containing an alkyl mercapto or aryl mercapto group in a reactive position. The following two examples describe the preparation of such un-ionized dyes.

EXAMPLE 25

*2-[di(3-ethyl-2(3H)-benzothiazolylidene)isopropyl- idene]-3(2H)-thianaphthenone-1,1-dioxide*

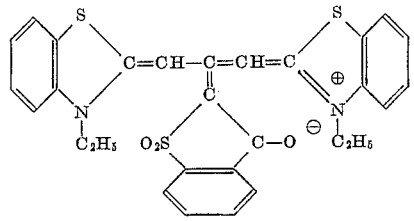

2 - [(3-ethyl-2(3H)-benzothiazolylidene)isopropylidene]- 3(2H)-thianaphthenone-1,1-dioxide (0.88 g., 1 mol.), 3- ethyl-2-ethylmercapto benzothiazolium ethylsulfate (3.49 g., 1 mol. plus 300 percent excess), and triethylamine (1.4 ml., 1 mol. plus 300 percent excess) were heated under reflux in pyridine (15 ml.) for thirty minutes. The reaction mixture was chilled, filtered, and the crude product washed with methyl alcohol. The yield of crude dye was 1.11 g. (81 percent). After two recrystallizations from pyridine the yield of purified dye was 0.68 g. (49 percent). M. P. >340° C.

EXAMPLE 26

*2-[di(1-ethyl-2(1H)-naphtho[1,2]thiazolylidene)iso- propylidene]-3(2H)-thianaphthenone-1,1-dioxide*

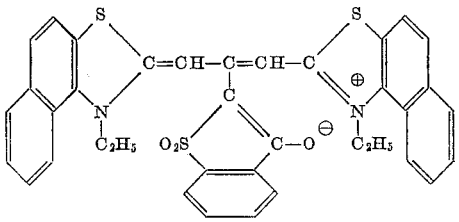

2 - [(1-ethyl - 2(1H) - naphtho[1,2]thiazolylidene)isopropylidene]-3(2H)-thianaphthenone-1,1-dioxide (0.95 g., 1 mol.), 1 - ethyl - 2 - ethylmercaptonaphtho[1,2]thiazolium ethylsulfate (3.99 g., 1 mol. plus 300 percent excess), and triethylamine (1.4 ml., 1 mol. plus 300 percent excess) were refluxed in pyridine (20 ml.) for thirty minutes. The reaction mixture was cooled, filtered, and the crude dye (1.46 g., 90 percent) was filtered off, washed with methyl alcohol, and dried. After two recrystallizations from pyridine, the yield of purified dye was 0.73 g. (45 percent). M. P.>340° C.

Certain of the intermediates represented by Formula III above are new while others have been previously described in the prior art. (See Troutman and Long, "J. A. C. S.," volume 70, page 3436 et seq.) The method of Troutman and Long was employed to make these intermediates, both new and old, the method comprising heating a compound represented by the formula:

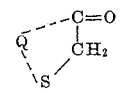

wherein Q has the values given above, together with aqueous hydrogen peroxide in the presence of acetic acid and acetic anhydride. The following examples will serve to illustrate this method of preparing the intermediates of Formula III.

EXAMPLE 27

*2-methyl-4(5H)-thiazolone-1,1-dioxide*

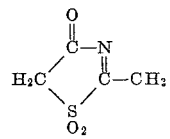

2-methyl-4(5H)-thiazolone (1.85 g.) was dissolved in a mixture of acetic acid (155 ml.) and acetic anhydride (40 ml.) in a 500 ml. three-necked flask, fitted with a condenser and thermometer. 30% hydrogen peroxide (40 ml.) was then added and an ice water bath used to maintain the temperature below 60° C. The mixture was allowed to stand overnight and then the solvent was removed under reduced pressure and the residue dissolved in benzene (300 ml.). The benzene solution was dried and the benzene was distilled off. The product remained as a colorless viscous oil. The yield was 6.5 g. (58%).

EXAMPLE 28

*2-methyl-4(5H)-thiazolone*

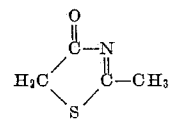

Thioacetamide (1 mol., 37 g.), chloroacetic acid (1 mol., 47.2 g.) and acetic acid (50 ml.) were mixed and heated under reflux for ten minutes. The reaction mixture was poured into water (500 ml.), neutralized with sodium carbonate and extracted with four 200 ml. portions of benzene. The benzene solutions were then concentrated and the residual oil distilled under reduced pressure. The yield of colorless oil was 40 g. (69%), B. P. 120–122° C./5 mm.

EXAMPLE 29

*3(2H)-thianaphthenone-1,1-dioxide*

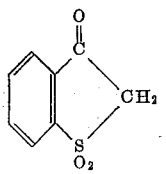

This compound was prepared by replacing the 2-methyl-4(5H)-thiazolone (2-methyl-2-thiazolin-4-one) of Example 27 by a molecularly equivalent amount of 3(2H)-thianaphthenone. The product was obtained as a white, crystalline compound, M. P. 134–5° C. dec.

*Anal.*—Calcd. for C₈H₆O₃S: C, 52.7; H, 3.3. Found: C, 52.6; H, 3.1.

Troutman and Long have also described a number of intermediates which can advantageously be employed in practicing our invention. These can be represented by the formula:

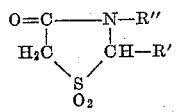

| R' | R'' |
|---|---|
| phenyl | methyl |
| Do. | ethyl |
| Do. | n-propyl |
| Do. | n-butyl |
| Do. | benzyl |
| 4-chlorophenyl | methyl |
| Do. | ethyl |

All of the dyes of our invention are particularly useful in manufacturing photographic, silver halide emulsions, serving to alter the sensitivity thereof. Sensitization by means of our new dye is, of course, directed primarily to the ordinarily employed, gelation-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Methanol has proven satisfactory as a solvent for the majority of our new dyes.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dyes of our invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; anti-foggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees "The Theory of the Photographic Process," Macmillan pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. application 771,380, filed August 29, 1947 (now U. S. Patent 2,640,776), etc.; or mixtures of such addenda. Dispersing agents for color couplers, such as those set forth in U. S. Patents 2,322,027 and 2,304,940, can also be employed in the above-described emulsions.

What we claim as our invention and desire secured by Letters Patent of the United States is:

1. A merocyanine dye selected from those represented by the following general formula:

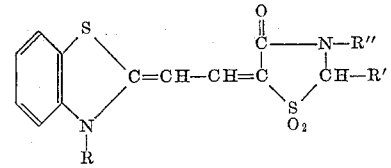

wherein R and R'' each represents a lower alkyl group and R' represents an aryl group of the benzene series.

2. A merocyanine dye selected from those represented by the following general formula:

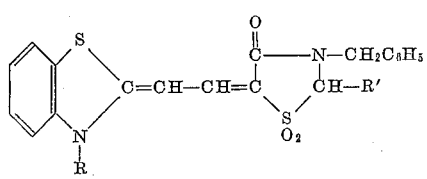

wherein R represents a lower alkyl group, and R' represents an aryl group of the benzene series 3. A merocyanine dye selected from those represented by the following general formula:

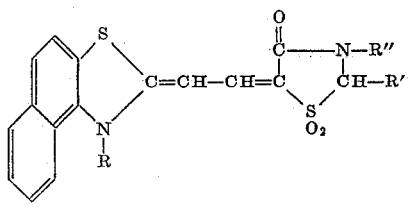

wherein R and R" each represents a lower alkyl group and R' represents an aryl group of the benzene series.

4. A merocyanine dye selected from those represented by the following general formula:

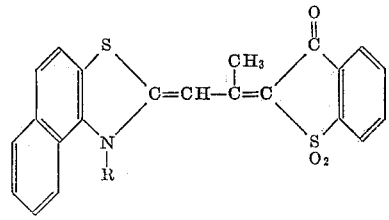

wherein R represents a lower alkyl group.

5. A merocyanine dye selected from those represented by the following general formula:

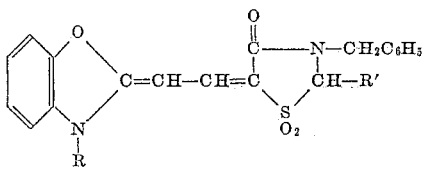

wherein R represents a lower alkyl group and R' represents an aryl group of the benzene series.

6. The merocyanine dye having the following formula:

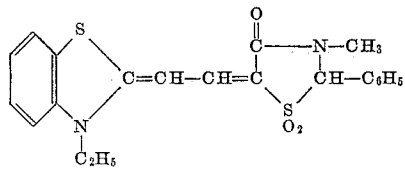

7. The merocyanine dye having the following formula:

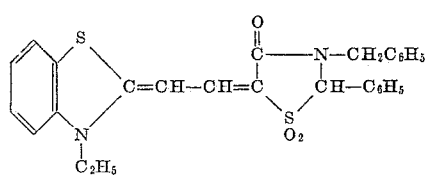

8. The merocyanine dye having the following formula:

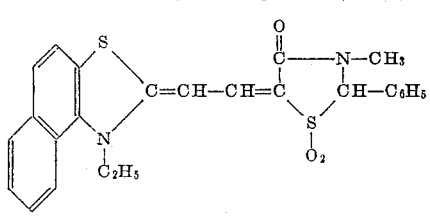

9. The merocyanine dye having the following formula:

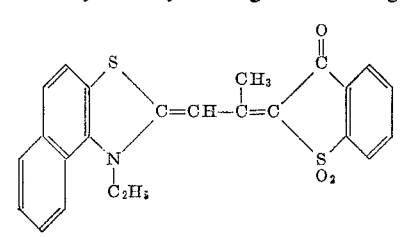

10. The merocyanine dye having the following formula:

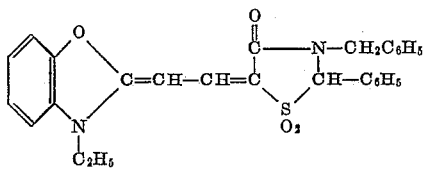

11. A process for preparing merocyanine dyes comprising condensing a compound selected from those represented by the following two general formulas:

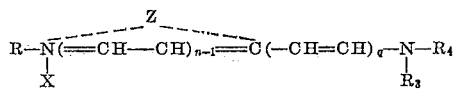

and

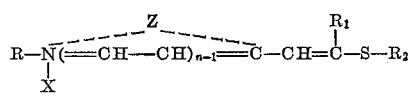

wherein R and $R_1$ each represents an alkyl group, $R_2$ represents a member selected from the group consisting of an alkyl group and an aryl group, $R_3$ represents an acyl group, $R_4$ represents an aryl group, X represents an acid radical, $q$ represents a positive integer of from 1 to 2, Z represents the non-metallic atoms necessary to complete a heterocyclic nucleus containing from 5 to 6 atoms in the heterocyclic ring, $n$ represents 1 when Z represents the non-metallic atoms necessary to complete a heterocyclic nucleus containing 5 atoms in the heterocyclic ring and $n$ represents 2 when Z represents the non-metallic atoms necessary to complete a heterocyclic nucleus containing 6 atoms in the heterocyclic ring together with a compound selected from those represented by the following general formula:

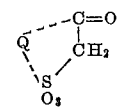

wherein Q represents the non-metallic atoms necessary to complete a heterocyclic nucleus containing five atoms in the heterocyclic ring, three of said atoms being carbon atoms, one of said atoms being a sulfur atom, and one of said atoms being selected from the group consisting of a carbon atom and a nitrogen atom 12. A process according to claim 11 wherein the condensation is carried out in the presence of a basic condensing agent.

13. A process according to claim 12 wherein the basic condensing agent is triethylamine.

14. A merocyanine dye selected from those represented by the following general formula:

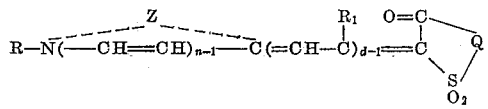

wherein R represents an alkyl group of the formula $C_mH_{2m+1}$ wherein $m$ represents a positive integer of from 1 to 4, $R_1$ represents a member selected from the group consisting of a hydrogen atom and a methyl group, $d$ represents a positive integer of from 1 to 2 when $R_1$ represents a member selected from the group consisting of a hydrogen atom and a methyl group and $d$ represents 3 when $R_1$ represents a hydrogen atom, Q represents the non-metallic atoms necessary to complete a heterocyclic nucleus containing 5 atoms in the heterocyclic ring, 3 of said atoms being carbon atoms, 1 of said atoms being a sulfur atom, and 1 of said atoms being selected from the group consisting of a carbon atom and a nitrogen atom, Z represents the non-metallic atoms necessary to complete a heterocyclic nucleus containing from 5 to 6 atoms in the heterocyclic ring selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series, and those of the 4-pyridine series, and $n$ represents 1 when Z represents the non-metallic atoms necessary to complete a heterocyclic nucleus containing 5 atoms in the heterocyclic ring and $n$ represents 2 when Z represents the non-metallic atoms necessary to complete a heterocyclic nucleus containing 6 atoms in the heterocyclic ring.

No references cited.